United States Patent
Suri et al.

(10) Patent No.: US 12,039,855 B1
(45) Date of Patent: *Jul. 16, 2024

(54) MACHINE LEARNING BASED CONTROL OF ALERTS GENERATED FOR MONITORING EQUIPMENT

(71) Applicant: Hello Therma Inc., San Francisco, CA (US)

(72) Inventors: Manik Varun Suri, San Francisco, CA (US); Aaron Morris Cohen, Westport, CT (US); Andrew Hager, Solvang, CA (US); Amber Hager, Solvang, CA (US)

(73) Assignee: HELLO THERMA INC., San Francisco, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/726,397

(22) Filed: Apr. 21, 2022

Related U.S. Application Data

(60) Provisional application No. 63/317,915, filed on Mar. 8, 2022.

(51) Int. Cl.
*G08B 23/00* (2006.01)
*G06N 20/00* (2019.01)

(52) U.S. Cl.
CPC ............ *G08B 23/00* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,709,005 B1* | 7/2023 | Suri | F24F 11/32 62/126 |
| 2007/0277538 A1 | 12/2007 | Buck | |
| 2014/0266713 A1 | 9/2014 | Sehgal et al. | |
| 2015/0330861 A1 | 11/2015 | Alsaleem | |

* cited by examiner

*Primary Examiner* — K. Wong
(74) *Attorney, Agent, or Firm* — FENWICK & WEST LLP

(57) ABSTRACT

A system generates alerts based on sensor data obtained from equipment, for example, refrigeration equipment. Examples of equipment instances include refrigeration equipment, heating equipment, air conditioning equipment, and so on. The system accesses a model, for example, a machine learning model trained to predict an alert threshold for generation of alerts. The system modifies the alert threshold value for an equipment instance based on the output of the machine learning model. The system uses the modified alert threshold value for generating alerts. The system may track the number of times the alert threshold was adjusted. If the number of times the alert threshold value is modified exceeds a predetermined fault threshold value, the system determines that the equipment is faulty.

20 Claims, 7 Drawing Sheets

MACHINE LEARNING BASED CONTROL OF ALERTS GENERATED FOR MONITORING EQUIPMENT

CROSS-REFERENCE TO RELATED APPLICATION

This application claims the benefit of U.S. Provisional Application No. 63/317,915, filed on Mar. 8, 2022, which is incorporated by reference in its entirety.

FIELD OF INVENTION

The disclosure relates to machine learning models in general and more specifically to controlling alerts generated for monitoring equipment based on machine learning models.

BACKGROUND

Several systems, for example, sensor-based equipment such as equipment connected with IoT (internet of things) devices sends alerts to users in various situations. Sensors associated with such equipment may detect specific conditions for the equipment and if these conditions are detected, the system sends alerts. For example, the sensors may detect certain condition that needs human intervention and send alerts. The condition may indicate equipment that needs maintenance, faulty equipment, or even certain dangerous condition for the equipment. A user, for example, an administrator or operator may monitor alerts generated by several such equipment instances using an application running on a client device. As a result, the application used for monitoring the equipment may receive a very large number of alert messages. A very high rate of alerts wastes bandwidth and computing resources and provides poor user experience since the operator monitoring the alerts may start ignoring the alerts if there are too many alerts. As a result, alerts that may be reporting faulty equipment or dangerous conditions may get ignored resulting in serious consequences.

SUMMARY

A system monitors alerts generated by equipment and adjusts the rate of generation of alerts by different equipment instances. Examples of equipment instances include refrigeration equipment, heating equipment, air conditioning equipment, and so on. The system receives sensor data generated by sensors mounted on equipment instances. The system monitors a rate of generation of alerts by equipment instances. An alert indicates a request for attention by an equipment instance. The alert may be generated responsive to a sensor data exceeding an alert threshold value. The system accesses a model, for example, a machine learning model trained to predict a threshold for generation of alerts. The system may repeat the following steps multiple times. The system determines that the rate of generation of alerts exceeds a rate threshold value. The system receives a set of features describing the equipment. The features include different types of information, for example, number of alerts received during a time interval, a measure of an indication that an action was taken to adjust the equipment in response to an alert sent, and so on. The system provides the set of features as input to the machine learning model and executes the machine learning model based on the set of features. The system modifies the alert threshold value for an equipment instance based on the output of the machine learning model. The system uses the modified alert threshold value for generating alerts.

In some embodiments, the system tracks the number of times the alert threshold was adjusted, for example, from the time the equipment instance was started. If the number of times the alert threshold value is modified exceeds a predetermined fault threshold value, the system determines that the equipment is faulty.

According to some embodiments, the system monitors alerts generated by refrigeration equipment and determines whether any refrigeration equipment instance is faulty. The techniques disclosed may be applied to other types of equipment, for example, heating equipment, air conditioning equipment, and so on. According to an embodiment, the system receives sensor data generated by sensors mounted on a refrigeration equipment instance. Examples of sensor data include temperature and humidity. The system monitors the rate of generation of alerts by the refrigeration equipment instance. An alert indicates a request for attention by the refrigeration equipment instance. Alerts may be generated responsive to sensor data exceeding an alert threshold value. The system repeats the following steps multiple times. The system determines that the rate of generation of alerts by the refrigeration equipment exceeds a rate threshold value. The system modifies the alert threshold value. The modified alert value is expected to reduce the rate of generation of alerts by the refrigeration equipment. The system uses the modified alert threshold value for generating alerts for the equipment instance. The system tracks the number of times the alert threshold was modified for a refrigeration equipment instance. If the number of times the alert threshold value was modified exceeds a fault threshold value, the system determines that the refrigeration equipment instance is faulty.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Overall System Environment

Figure 1:
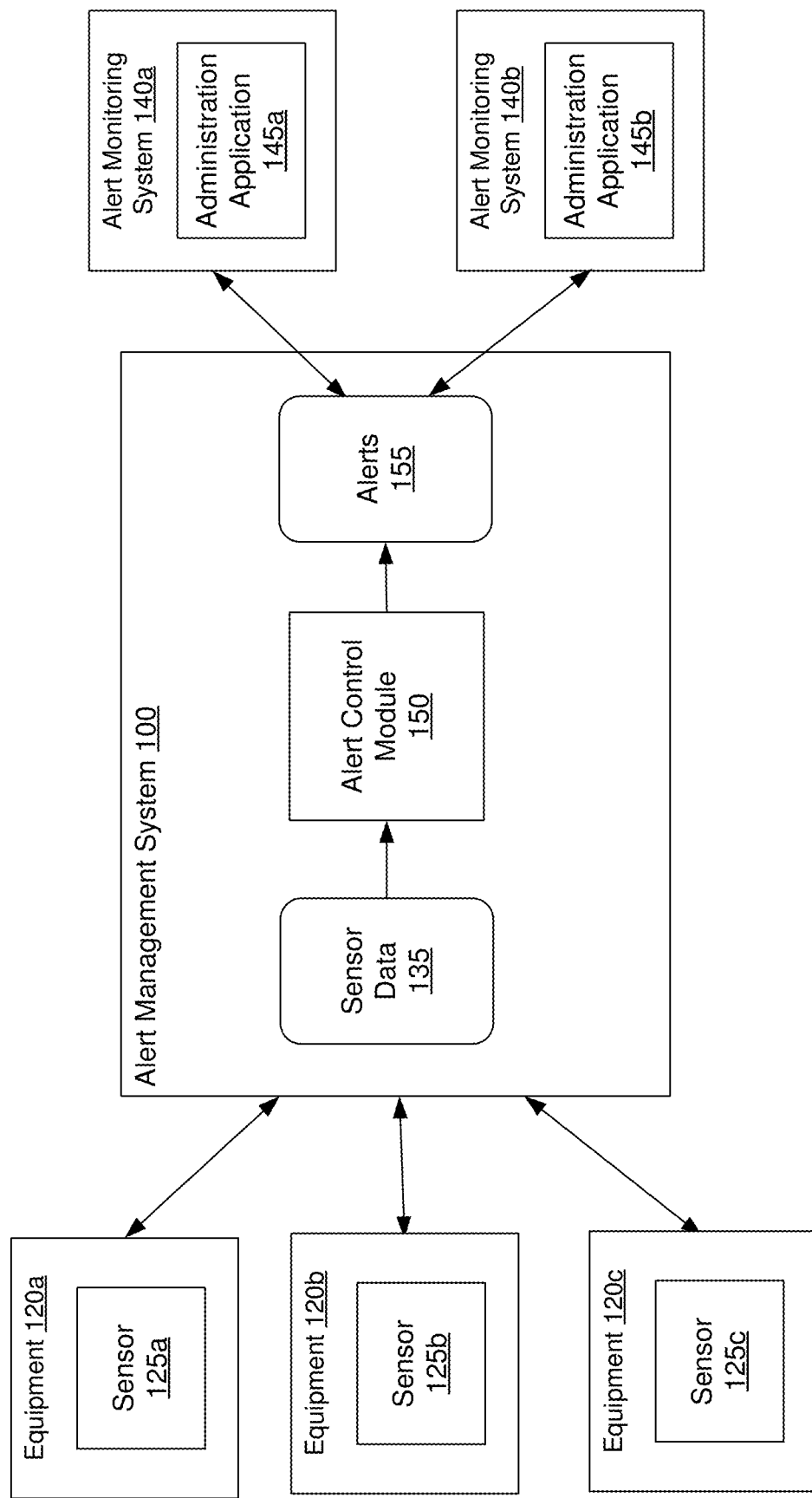
FIG. 1 shows the overall system environment for management of alerts, according to an embodiment.

FIG. 1 shows the overall system environment for management of alerts, according to an embodiment. The system environment includes equipment 120, an alert management system 100, and alert monitoring systems 140. In other embodiments, more or fewer components than those indicated in FIG. 1 may be used. For example, there may be more or fewer instances of equipment 120 shown in FIG. 1.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g., "120" in the text refers to reference numerals "120a" and/or "120b" in the figures).

The equipment 120 may represent machines or appliances that are monitored using the alert management system 100. An equipment 120 may be attached with one or more sensors 125, for example, equipment 120a is connected with sensor 125a, equipment 120b is connected with sensor 125b, equipment 120c is connected with sensor 125c, and so on. Examples of equipment being monitored include refrigerator, heater, machinery, medical equipment, and so on. The sensors are configured to send sensor data to the alert management system 100. In some embodiments, there may be multiple instances of alert management systems 100. For example, in certain configurations, the alert management system is installed on a device directly connected to the equipment 120.

The alert management system 100 receives sensor data 135 from sensors of one or more equipment 120. The sensor data may be received as a time series data. The alert generation module 150 processes the sensor data to detect specific conditions for the equipment being monitored. The alert generation module 150 generates alerts 155 based on the analysis of the sensor data 135. For example, the alert generation module 150 may compare the sensor data with specific thresholds or ranges of thresholds to determine whether an alert is generated.

The alerts 155 generated are sent to alert monitoring systems 140. An alert monitoring system 140 receives the alerts generated by the alert management system 100 and may display information describing the alerts via an application, for example, the administration application 145. There may be multiple instances of the alert monitoring system 140, for example, alert monitoring system 140a running administration application 145a, alert monitoring system 140b running administration application 145b, and so on. For example, different users or operator may monitor alerts generated by the same equipment or different equipment.

An administrator monitoring the alerts may take certain corrective action based on the alerts. For example, if an alert indicates a fault with the equipment, the administrator may send a technician to fix the equipment. For example, the alert may indicate low battery and the administrator may send someone to install a new battery. An administrator may choose to ignore certain alerts. For example, an alert may represent certain warning indicating a likelihood of a fault with the system. An administrator monitoring a large number of equipment may address some of the warnings but not necessarily all warnings.

The alert monitoring system 140 can be a conventional computer system (e.g., a desktop or laptop computer), a tablet, or a device having computer functionality such as a personal digital assistant (PDA), a mobile telephone, a smart phone or another suitable device. The alert monitoring system 140 interacts with the alert management system 100 via a network.

The online system 100 may be hosted on a computing system that includes one or more processors, memory, secondary storage and input/output controller. The computing system used for hosting the online system 100 is typically a server class system that uses powerful processors, large memory, and fast input/output systems compared to a typical computing system used, for example, as an administration system 140.

System Architecture

Figure 2:
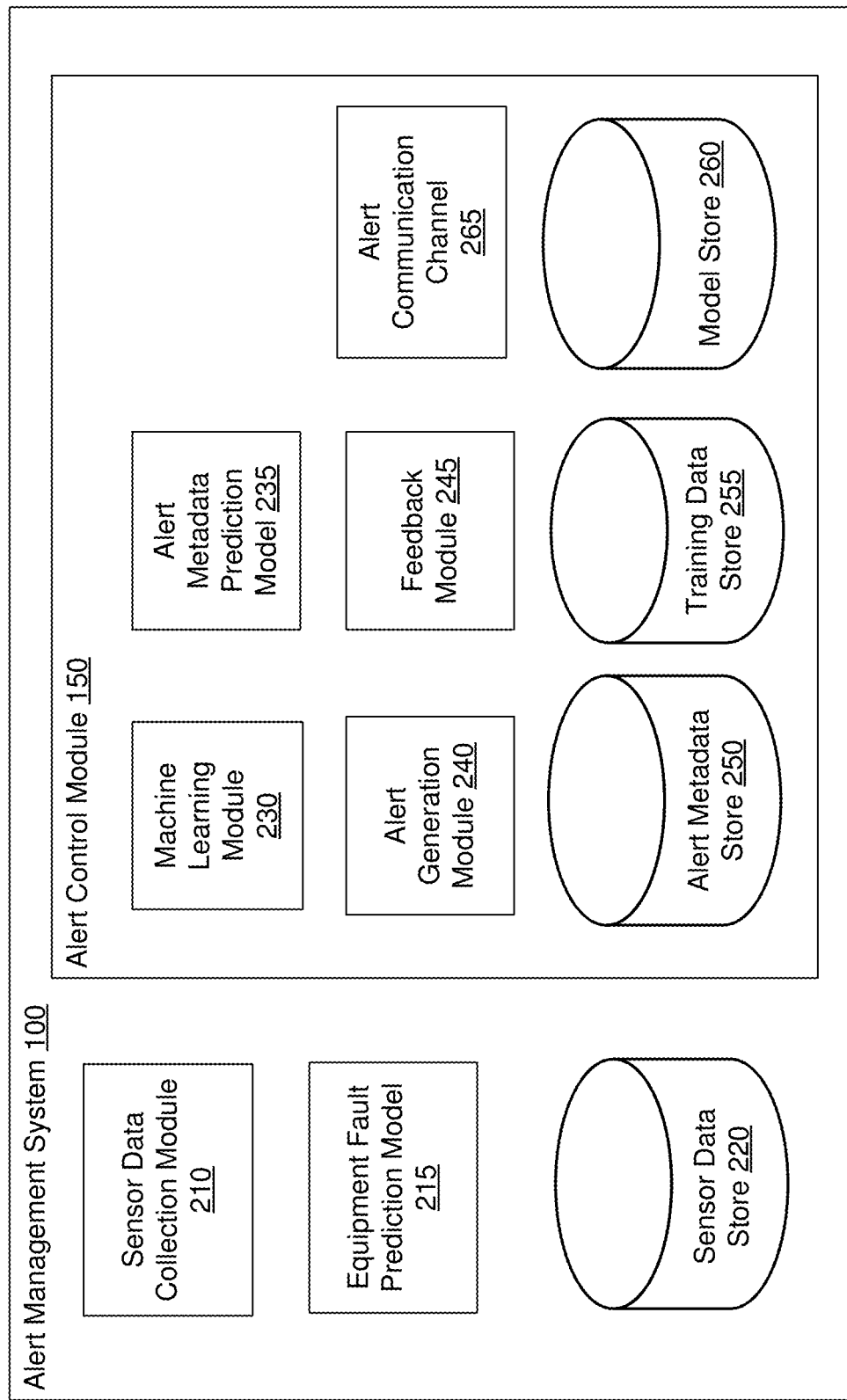
FIG. 2 shows the system architecture of an alert generation system, according to an embodiment.

FIG. 2 shows the system architecture of an alert generation system, according to an embodiment. The alert management system 100 includes a sensor data collection module 210, an equipment fault prediction model 215, a sensor data store 220, and the alert control module 150. In other embodiments, the online system 100 may include other modules not described herein. Functionality indicated as provided by a particular module may be implemented by other modules instead.

The sensor data collection module 210 receives and collects sensor data from one or more sensors connected to equipment being monitored. In an embodiment, the sensor data collection module 210 includes one or more listener threads or processes that wait for sensor data. The sensor data collection module 210 may store the sensor data in the sensor data store 220. According to an embodiment, the sensor data represents time series data and the sensor data store 220 is a time series database configured to efficiently store and process time series data. An equipment has an equipment type, for example, air conditioning equipment, refrigeration equipment, heating equipment, and so on. Each equipment type has one or more equipment instances. For example, an instance of the refrigeration equipment type is a particular installation of refrigeration equipment.

The alert control module 150 controls the alerts generated by the system and includes a machine learning module 230, an alert metadata prediction module 235, an alert communication channel 265, an alert generation module 240, a feedback module 245, an alert metadata store 250, a training data store 255, and a model store 260. Other embodiments may include more of fewer modules.

The machine learning module 230 trains a machine learning model for predicting metadata associated with alerts, for example, various threshold values associated with alerts for different types of equipment. The trained models are stored in the model store 260. The machine learning module 230 stores training data in the training data store 255 and uses the training data for training of the machine learning model.

The alert metadata prediction module 235 executes the machine learning models trained by the machine learning module 230 to predict metadata describing alerts, for example alert thresholds for generating alerts. The predicted alert threshold is used to adjust the rate of generation of alerts. For example, the alert control module 150 adjusts the thresholds of equipment based on the predicted alert threshold values. The equipment sends alerts if the sensor data exceeds the alert threshold value. The alert control module 150 adjusts the alert thresholds by modifying the alert threshold so that the rate of generation of alerts is decreased as a result of modifying the alert thresholds. The alert metadata prediction module 235 provides the generated alert thresholds to the alert generation module 240. The determined thresholds are stored in the alert metadata store 250.

The alert generation module 240 compares sensor data with thresholds determined by the alert metadata prediction module 235 to generate alerts. The generated alerts are sent to the user via the alert communication channel 265. The alert communication channel 265 is used to send alerts to users, for example, system administrators via alert monitoring systems 140. The alert management system 100 may be configured to send alerts via different communication channels, for example, vias email, via text messages, via voice messages, via an application such as the administration application 145 used for monitoring alerts, and so on.

The feedback module 245 monitors any explicit or implicit feedback provided by uses monitoring the alerts. For example, a user may explicitly indicate whether an alert was useful or not. Alternatively, the feedback module 245 monitors whether the behavior of an equipment changed as a result of sending the alert. The feedback module 245 monitors the sensors of an equipment instance after sending an alert. If there is no change in the sensor data generated by sensors of the equipment instance within a threshold time after sending the alert, the feedback module 245 determines that the alerts are being ineffective since the users (e.g., system administrators) monitoring the alerts that are supposed to take an action in response to the alert are ignoring the alerts and not taking the required action.

The equipment fault prediction model 215 predicts whether an instance of equipment is faulty. In an embodiment, the equipment fault prediction model 215 receives information describing the adjustments made to the alert thresholds by the alert control module 150 to determine whether an equipment is faulty. The equipment fault prediction model 215 uses a fault threshold value for determining whether the equipment instance is faulty.

Figure 3:
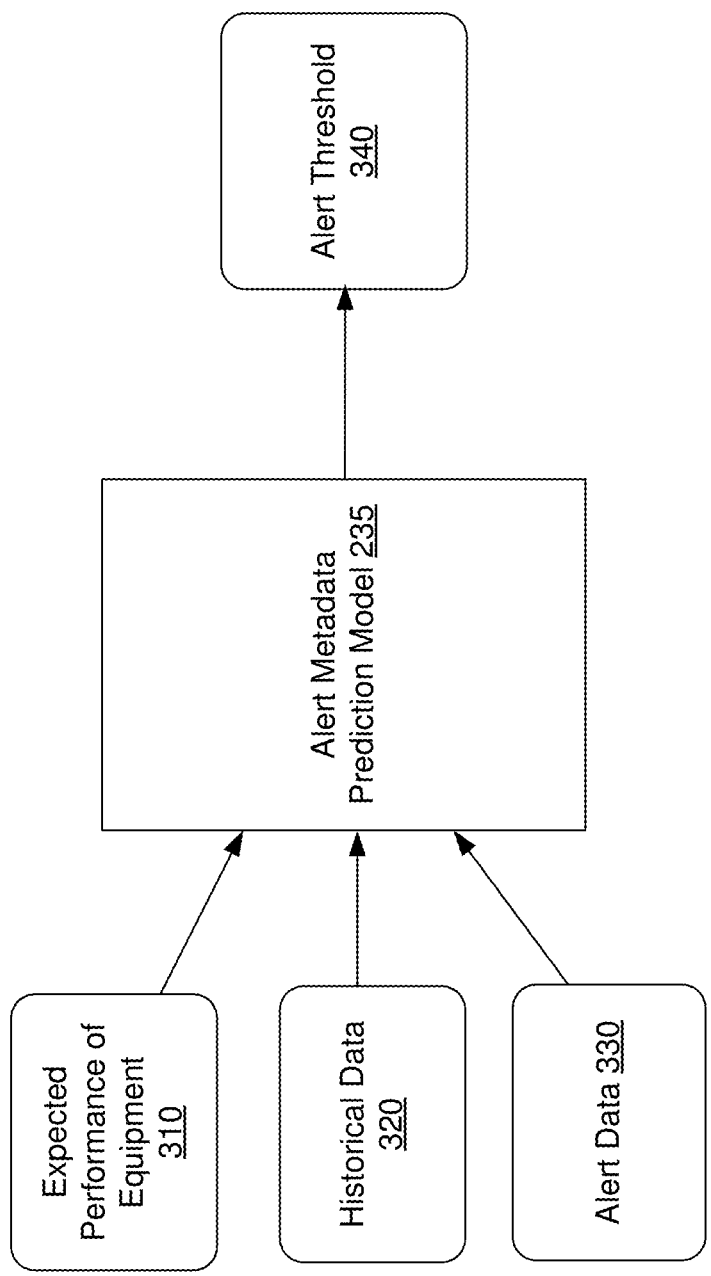
FIG. 3 illustrates an alert metadata prediction model, according to an embodiment.

FIG. 3 illustrates an alert metadata prediction model, according to an embodiment. The alert metadata prediction model 235 receives various features and predicts metadata describing alerts, for example, alert thresholds 340.

The input received by the alert metadata prediction model includes expected performance 310 of the equipment of a particular type. For example, if the sensor is detecting temperature of certain equipment, the system receives information describing the normal temperature ranges for the equipment. The system determines whether the current performance is a deviation from the normal behavior of the equipment.

The input received by the alert metadata prediction model includes historical data 320. For example, the input describes the historical values of sensor data. The input may include information describing the sensor data values that were considered normal in the past, i.e., the sensor data ranges that were determined to represent normal operation of the equipment without any condition that required intervention. The input may describe different ranges of sensor data for different contexts, for example, the normal range of sensor data of one equipment instance may be different from the normal range of sensor data for another equipment instance of the same equipment type.

Another type of input provided to the alert metadata prediction model 235 is information indicating whether a user monitoring the alerts acted in response to alerts being reported to the application or client devices of the user. As another example, if the system detects that the equipment was faulty, the system monitors if the equipment was fixed in response to the alerts. If the system detects that the equipment behavior did not change as a result of sending alerts, the system determines that the alerts are being ineffective.

In one embodiment, the system monitors the equipment behavior to determine whether the equipment behavior changed as a result of sending the alerts. The system may monitor sensor data generated by the equipment (e.g., equipment temperature, pressure, voltage level, current level, and so on) in response to sending an alert. For example, the system monitors the sensor data for a time interval after sending an alert. If the system detects that the sensor data changed within the time interval in a manner that indicates the equipment performance has improved as a result of sending the alerts, the system records the information and provides as input the alert metadata prediction model 235. The system may encode the information describing the user feedback using records that identify the sensor data value when the alert was sent and a flag indicating whether the user responded to the alert, for example, flag=true if the user is determined to have responded and flag=false if the user is determined to have ignored the alert.

The input received by the alert metadata prediction model includes alert data 330, for example, number of alerts that have been sent within a recent time interval. The alert data 330 may represent a measure of frequency of alerts that are being sent. In an embodiment, the system maintains a time series representing the number of alerts being sent in each time interval. The system provides the most recent portion of the time series as input to the alert metadata prediction model 235.

In an embodiment, the alert metadata prediction model 235 is a rule-based system that stores a set of rules to predict the alert metadata. A rule may identify various criteria based on the inputs of the alert metadata prediction model 235 and determine alert metadata values based on the criteria that are satisfied. For example, a rule may specify that if the user responded to an alert reported in response to a particular alert threshold, the modified alert threshold should be determined using a specified expression. The alert metadata prediction model 235 evaluates the rules periodically for the currently available input data to predict the alert metadata values such as the alert thresholds.

In an embodiment, the alert metadata prediction model 235 is a machine learning based model that is trained using training data, for example, labeled data for various values of input data. The system extracts various features and provides them as input to the machine learning based model.

In an embodiment, the system uses different alert metadata prediction models 235 for different contexts. For example, the system may use different alert metadata prediction models 235 for each equipment instance. The system may use different alert metadata prediction models 235 for each set of equipment instances. For example, the system may use a particular alert metadata prediction model 235 for a set of equipment instances and a different alert metadata prediction model 235 for a different set of equipment instances. The system may use different alert metadata prediction models 235 for different locations, each location associated with a different set of equipment instances. The system may use different alert metadata prediction models 235 models for different equipment types. The system may use a different alert metadata prediction model 235 for each organization, where each organization has a set of equipment instances.

In an embodiment, the system uses a different alert metadata prediction model 235 for different time values. For example, the system uses a different alert metadata prediction model 235 for different times of day. For example, the system may use a model M1 for a time interval during evening and a different model M2 for a time interval in the morning. This is so because the system may have different values of sensor data during different times of the day, depending on how actively the equipment is used. Accordingly, the alert thresholds are adjusted differently for different times of the day.

In an embodiment, the system uses a different alert metadata prediction model 235 for different days of the week. For example, the system may use a model M1' for Mondays and a different model MT for Fridays. This is so because the system may have different values of sensor data during different days of the week, depending on how actively the equipment is used.

In an embodiment, the system repeatedly adjusts thresholds of alerts to manage the rate of alerts so that the alerts are most effective. The system adjusts the threshold to as to reduce the rate of the alerts. For example, the system may increase the threshold so that the rate at which alerts are sent is reduced. The system may repeatedly adjust the threshold to keep reducing the rate. At certain point, the system determines that the threshold should not be further increased and instead sends a different message indicating equipment failure.

Processes for Managing Alerts

Various processes associated with alert generation are described herein. The steps of processes described herein may be performed in an order different from that indicated herein, to the extent permitted by the data flow of the process. The steps are described as being performed by a system, for example, the alert management system 100 and may be performed by various modules as shown in FIG. 2.

Figure 4:
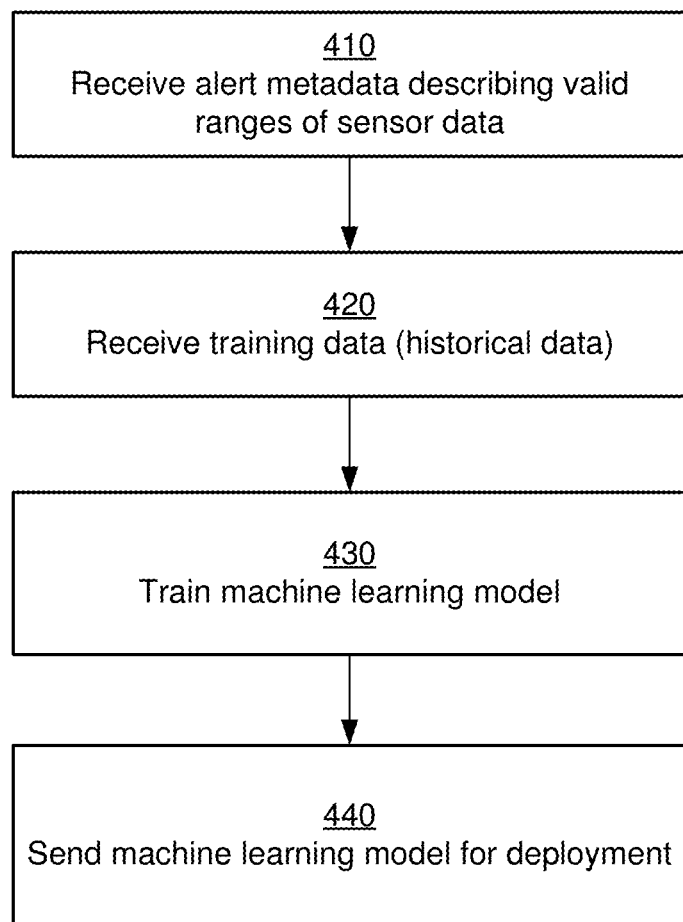
FIG. 4 shows a flowchart illustrating the process for generating an alert metadata prediction model, according to an embodiment.

FIG. 4 shows a flowchart illustrating the process for generating an alert metadata prediction model, according to an embodiment. The system receives 410 alert metadata, for example, valid ranges of sensor data generated by equipment. The system receives 420 training data, for example, labelled historical data. In an embodiment, each set of values of input data is labelled with known output values. The alert metadata prediction model 235 is trained 430 using the labelled data for example, by predicting output values for input data and comparing with known output values represented by the labels to determine a loss value. The alert metadata prediction model 235 is trained to minimize the loss value using a technique such as backpropagation that adjusts the weights (parameters of the machine learning model). The system sends 440 the trained machine learning model for deployment, for example, on devices associated with individual equipment instances.

In an embodiment, the system trains a different alert metadata prediction model 235 for each context. For example, the system may receive different training dataset for each context and train the alert metadata prediction models 235 based on the training dataset. The alert metadata prediction model 235 is pretrained and deployed and the alert metadata prediction model 235 is re-trained for specific deployments. Accordingly, the system trains a generic alert metadata prediction model 235 for a plurality of contexts and deploys the generic model in different contexts. The alert metadata prediction models 235 are incrementally trained for each context. Accordingly, the generic model is modified to obtain a customized model for each context.

Figure 5:
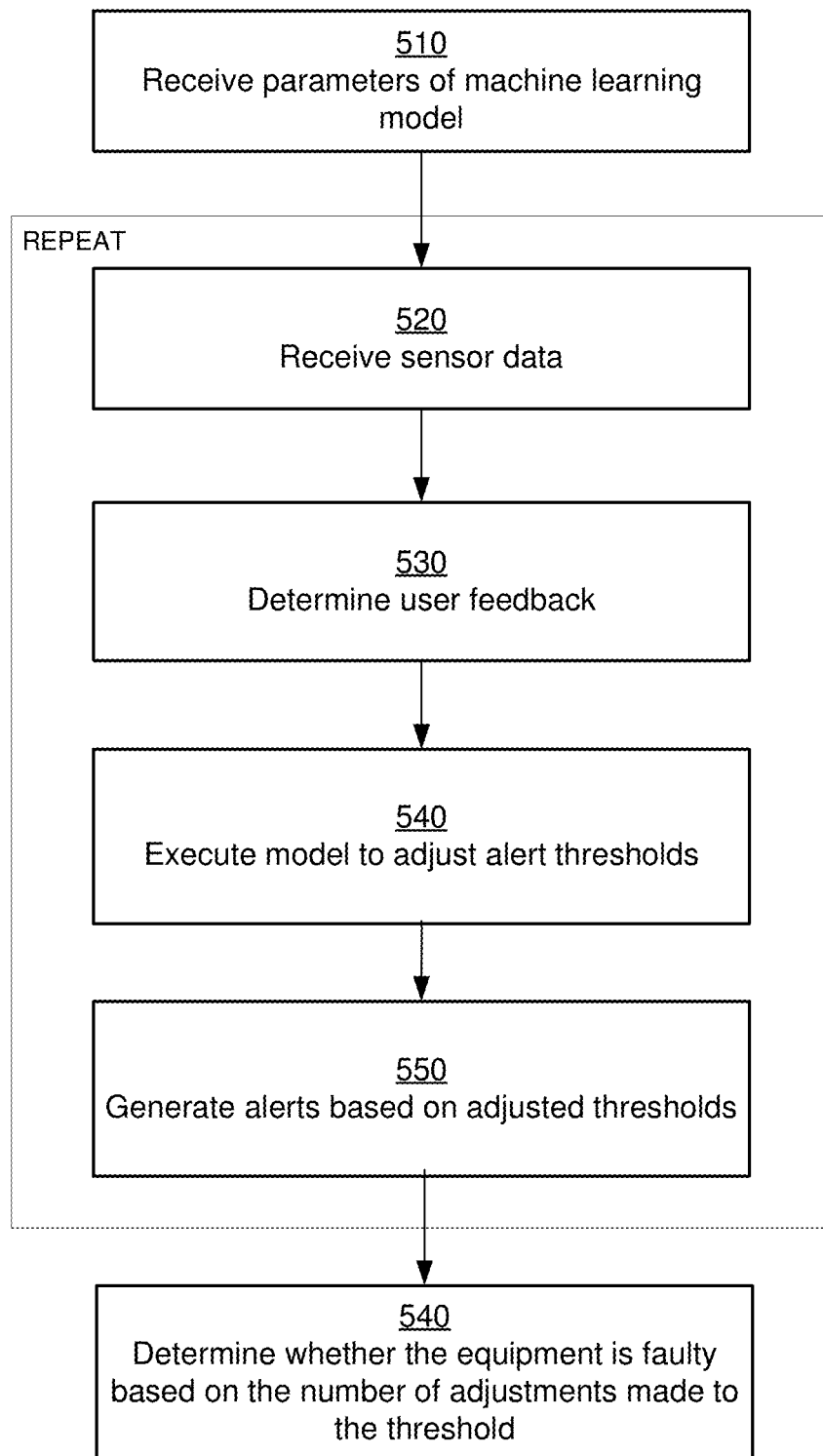
FIG. 5 shows a flowchart illustrating the process for managing alerts, according to an embodiment.

FIG. 5 shows a flowchart illustrating the process for managing alerts, according to an embodiment. The system receives 510 a trained machine learning model. The system repeats the steps 520, 530, 540, and 550. The system receives 520 sensor data generated by sensors associated with equipment instances. The system also determines 530 user feedback based on the sensor data as well as alerts previously sent by the system. For example, the system compares sensor data currently received with sensor data received before sending an alert to determine whether the sensor data changed as expected. For example, if the alert indicated that the sensor data, for example, temperature was above expected temperature threshold value before sending the alert and temperature decreased responsive to sending an alert, the system determines that the user was responsive to the alert. The system encodes the determined user feedback as features.

The system provides the extracted features to the machine learning model and executes 540 the machine learning model. The system modifies the alert thresholds based on the output of the machine learning model. For example, the output of the machine learning model may predict the alert threshold value. Alternatively, the output of the machine learning model may predict a modification to be made to a given alert threshold value. The system subsequently generates 550 alerts based on the modified alert threshold values.

The system repeats the above steps 520, 530, 540, and 550 multiple times. The system tracks the number of times the alert threshold was adjusted. For certain equipment, after adjusting the alert thresholds for one or more times, the equipment stops sending alerts since the equipment may have been adjusted by a user and does not need attention.

In some embodiment, the system maintains a fault threshold that represents a maximum number of times the system adjusts the threshold before determining that the equipment is faulty. The number of times the alert threshold is adjusted is counted for a time interval, for example, since the equipment instances was last started. In some embodiments, the number of times the alert threshold is adjusted is performed once for the equipment, for example, after the equipment is installed. Accordingly, for certain equipment, the system adjusts alerts a number of times that exceeds the fault threshold value. If the number of adjustments made to the alert threshold for an equipment instance exceeds the fault threshold value, the system determines that the equipment instance is faulty since the equipment continues to generate alerts in spite of adjusting the alert thresholds several times. The system may send a different alert to the operator indicating a likelihood of equipment being faulty.

In some embodiments, the system may take remedial action, for example, by shutting down the equipment or by adjusting some settings of the equipment. For example, the system may adjust the temperature setting of a refrigeration equipment to adjust (e.g., reduce) the load on the refrigeration equipment.

The process illustrated in FIG. 5 may be used for different types of equipment. For example, the process may be used to monitor refrigeration equipment. The sensor data received from the refrigeration equipment may be temperature and humidity. The system receives sensor data from several instances of refrigeration equipment. The system executes the machine learning model periodically for each refrigeration equipment instance to determine whether the alert threshold for that instance of refrigeration equipment needs to be adjusted. The system generates alerts using the adjusted thresholds. The system may repeatedly adjust the alert threshold for a particular refrigeration equipment instance. The system tracks the number of times the alert threshold was adjusted for the refrigeration equipment instance since the refrigeration equipment instance was started. If for a particular refrigeration equipment instance, the system adjusts the alert threshold more number of times than the fault threshold, the system determines that this particular refrigeration equipment instance is likely to be faulty. The system may send an alert accordingly.

The techniques disclosed herein may be applied to other types of equipment, for example, air conditioning equipment, heating equipment, various types of IoT (internet of things) based equipment that has sensor installed and sends alerts, or other types of machinery used in industry.

Figure 6:
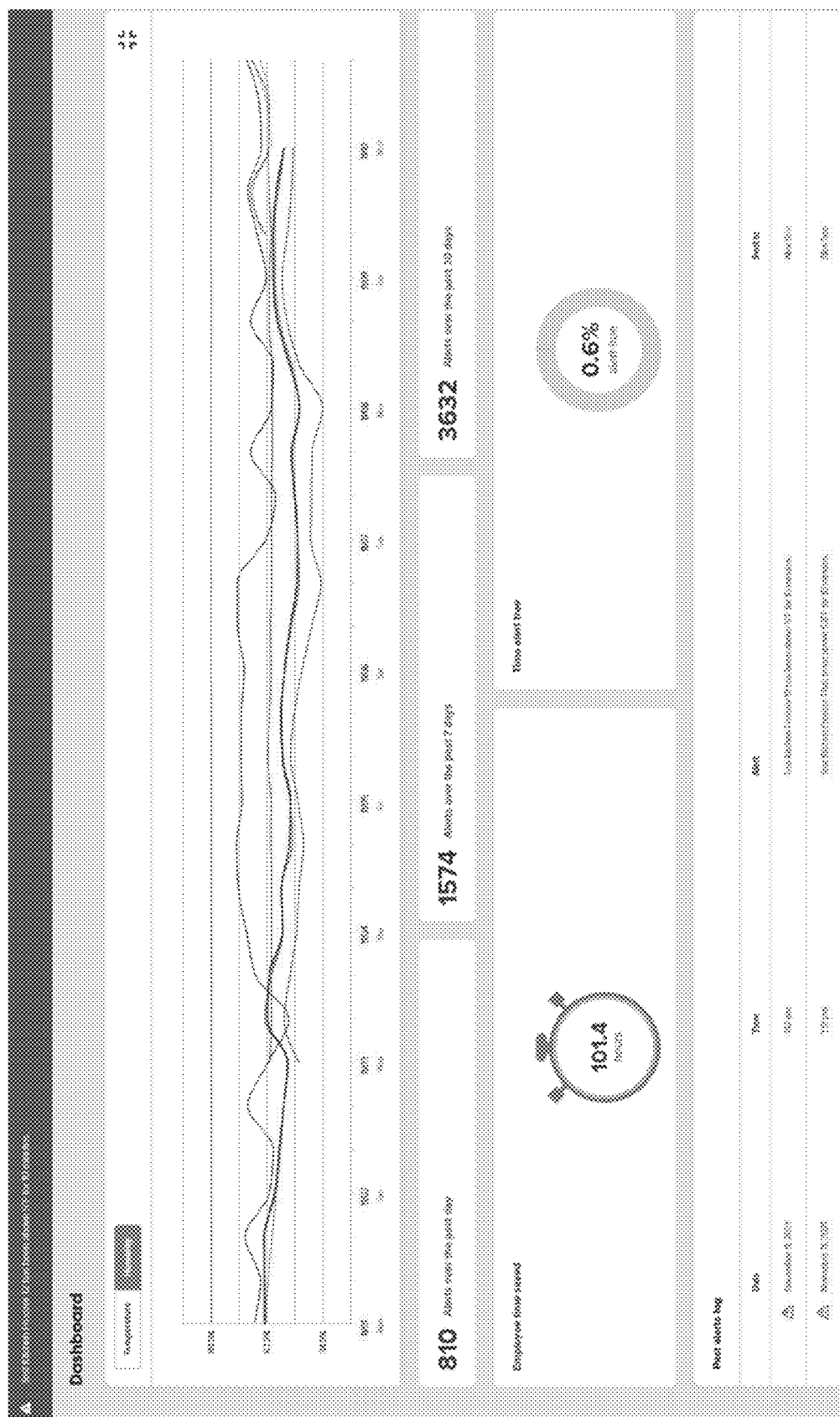
FIG. 6 shows screenshot of a use interface of a dashboard for monitoring an alert generation system, according to an embodiment.

FIG. 6 shows screenshot of a user interface of a dashboard for monitoring an alert generation system, according to an embodiment. The dashboard may be used to monitor multiple equipment instances. The dashboard shows information for each equipment instance.

The dashboard may report number of alerts generated in the past for different lengths of time intervals, for example, the number of alerts generated in the past day, in the past month (30 days), or the past year. In an embodiment, the system shows a graph that shows changes in the rate of alert generation over time. The graph displayed may be updated in real time. The dashboard may also show alert logs that display detailed messages associated with each alert that was reported.

Computing Machine Architecture

Figure 7:
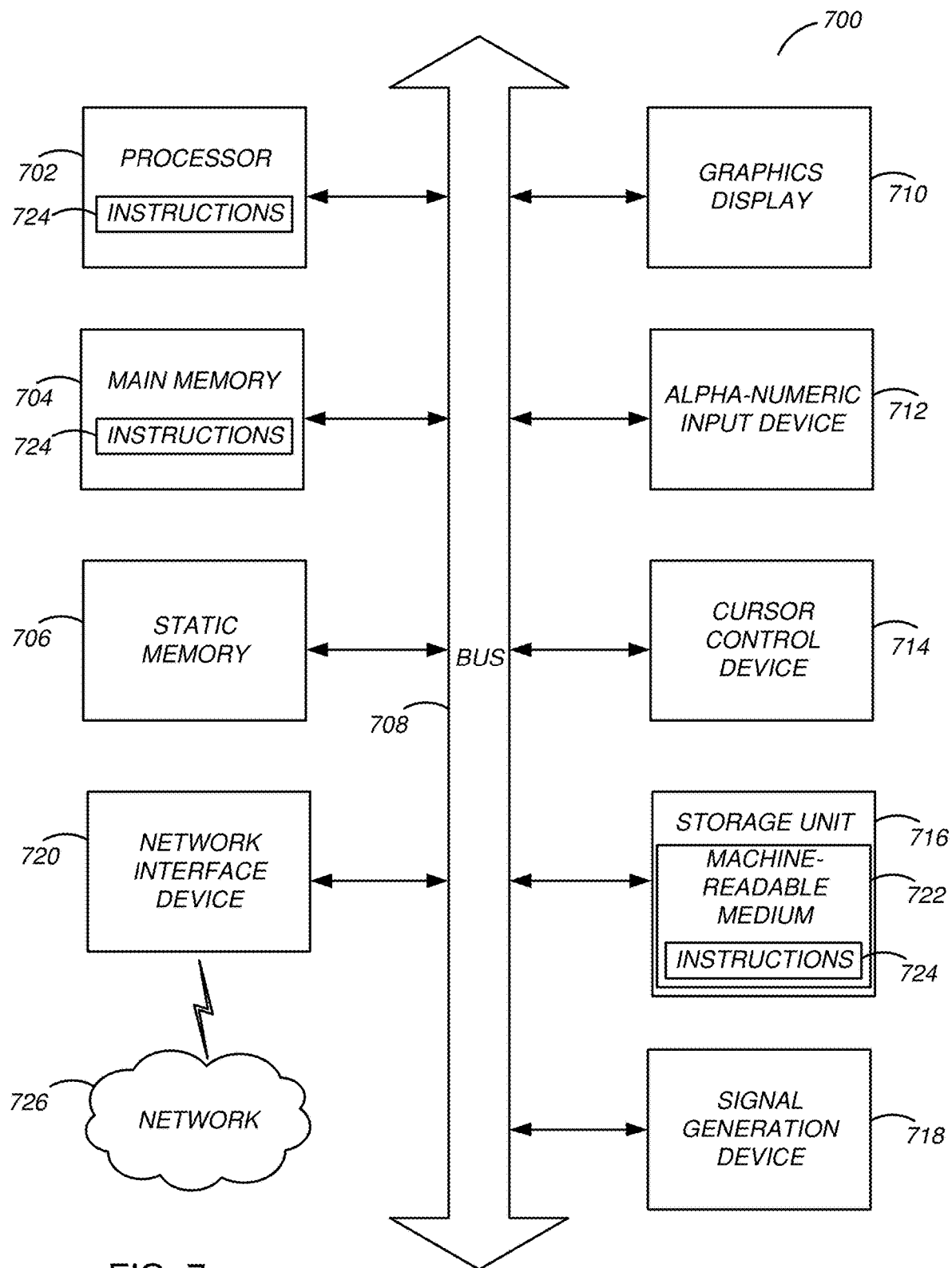
FIG. 7 is a block diagram illustrating components of an example machine able to read instructions from a machine-readable medium and execute them in a processor (or controller).

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Alternative Embodiments

It is to be understood that the figures and descriptions of the present invention have been simplified to illustrate elements that are relevant for a clear understanding of the present invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for monitoring alerts generated by equipment, the method comprising:
  receiving sensor data generated by sensors mounted on an equipment instance;
  monitoring a rate of generation of alerts by the equipment instance, an alert indicating a request for attention by an equipment instance, the alert generated responsive to a sensor data exceeding an alert threshold value;
  accessing a machine learning model trained to predict a threshold for generation of alerts; and
  repeating one or more times:
    determining that the rate of generation of alerts exceeds a rate threshold value;
    receiving a set of features associated with the equipment instance, the features describing alerts received during a time interval;
    providing the set of features as input to the machine learning model;
    executing the machine learning model based on the set of features to obtain a result;
    modifying the alert threshold value based on the result of the machine learning model; and
    using the modified alert threshold value for generating alerts for the equipment instance.

2. The method of claim 1, further comprising:
  responsive to the number of times the alert threshold value is modified exceeding a predetermined value, determining that the equipment instance is faulty.

3. The method of claim 1, wherein the set of features includes a feature representing a number of alerts received during a time interval.

4. The method of claim 1, wherein the set of features includes a feature representing a measure of an indication that an action was taken to adjust the equipment instance in response to an alert sent.

5. The method of claim 4, wherein the measure of the indication that an action was taken to adjust the equipment instance in response to an alert sent is determined based on a change in sensor data monitored responsive to sending the alert.

6. The method of claim 1, wherein the set of features includes a feature representing an expected normal performance of the equipment instance.

7. The method of claim 1, wherein modifying the alert threshold value comprises changing the alert threshold value to cause the rate of alerts to decrease.

8. The method of claim 1, wherein modifying the alert threshold value comprises determining a first threshold value for a first time interval during each day and a second threshold value for a second time interval during each day.

9. The method of claim 1, wherein modifying the alert threshold value comprises determining a first threshold value for a first set of equipment instances and a second threshold value for a second set of equipment instances.

10. A non-transitory computer-readable storage medium storing computer program instructions executable by a processor to perform operations comprising:
  receiving sensor data generated by sensors mounted on an equipment instance;
  monitoring a rate of generation of alerts by the equipment instance, an alert indicating a request for attention by an equipment instance, the alert generated responsive to a sensor data exceeding an alert threshold value;
  accessing a machine learning model trained to predict a threshold for generation of alerts; and
  repeating one or more times:
    determining that the rate of generation of alerts exceeds a rate threshold value;
    receiving a set of features associated with the equipment instance, the features describing alerts received during a time interval;
    providing the set of features as input to the machine learning model;

executing the machine learning model based on the set of features to obtain a result;

modifying the alert threshold value based on the result of the machine learning model; and using the modified alert threshold value for generating alerts for the equipment instance.

11. The non-transitory computer-readable storage medium of claim 10, wherein the computer program instructions further cause the processor to perform steps comprising:

responsive to the number of times the alert threshold value is modified exceeding a predetermined value, determining that the equipment instance is faulty.

12. The non-transitory computer-readable storage medium of claim 10, wherein the set of features includes a feature representing a number of alerts received during a time interval.

13. The non-transitory computer-readable storage medium of claim 10, wherein the set of features includes a feature representing a measure of an indication that an action was taken to adjust the equipment instance in response to an alert sent.

14. The non-transitory computer-readable storage medium of claim 13, wherein the measure of the indication that an action was taken to adjust the equipment instance in response to an alert sent is determined based on a change in sensor data monitored responsive to sending the alert.

15. The non-transitory computer-readable storage medium of claim 10, wherein the set of features includes a feature representing an expected normal performance of the equipment instance.

16. The non-transitory computer-readable storage medium of claim 10, wherein modifying the alert threshold value comprises changing the alert threshold value to cause the rate of alerts to decrease.

17. The non-transitory computer-readable storage medium of claim 10, wherein modifying the alert threshold value comprises determining a first threshold value for a first time interval during each day and a second threshold value for a second time interval during each day.

18. The non-transitory computer-readable storage medium of claim 10, wherein modifying the alert threshold value comprises determining a first threshold value for a first set of equipment instances and a second threshold value for a second set of equipment instances.

19. A computer system comprising:

one or more electronic processors; and a non-transitory computer-readable storage medium storing computer program instructions executable by a processor to perform operations comprising:

receiving sensor data generated by sensors mounted on an equipment instance;

monitoring a rate of generation of alerts by the equipment instance, an alert indicating a request for attention by an equipment instance, the alert generated responsive to a sensor data exceeding an alert threshold value;

accessing a machine learning model trained to predict a threshold for generation of alerts; and repeating one or more times:

determining that the rate of generation of alerts exceeds a rate threshold value;

receiving a set of features associated with the equipment instance, the features describing alerts received during a time interval;

providing the set of features as input to the machine learning model;

executing the machine learning model based on the set of features to obtain a result;

modifying the alert threshold value based on the result of the machine learning model; and using the modified alert threshold value for generating alerts for the equipment instance.

20. The computer system of claim 19, wherein the computer program instructions further cause the processor to perform steps comprising:

responsive to the number of times the alert threshold value is modified exceeding a predetermined value, determining that the equipment instance is faulty.

* * * * *